(12) United States Patent
Franklin et al.

(10) Patent No.: US 9,843,964 B2
(45) Date of Patent: Dec. 12, 2017

(54) METHOD AND APPARATUS FOR MANAGING CONGESTION IN WIRELESS COMMUNICATION SYSTEM

(71) Applicant: Samsung Electronics Co., Ltd., Gyeonggi-do (KR)

(72) Inventors: Antony Franklin, Tamil Nadu (IN); Jungshin Park, Seoul (KR); Cheolgi Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 195 days.

(21) Appl. No.: 14/589,569

(22) Filed: Jan. 5, 2015

(65) Prior Publication Data
US 2015/0195746 A1 Jul. 9, 2015

(30) Foreign Application Priority Data
Jan. 3, 2014 (KR) .......................... 10-2014-0000811

(51) Int. Cl.
*H04W 28/22* (2009.01)
*H04W 28/02* (2009.01)
(Continued)

(52) U.S. Cl.
CPC ......... *H04W 28/22* (2013.01); *H04L 41/0893* (2013.01); *H04L 41/5025* (2013.01);
(Continued)

(58) Field of Classification Search
CPC ..... H04L 47/14; H04L 65/80; H04L 12/1407; H04L 41/0893; H04L 47/20; H04L 65/4069; H04L 41/0896; H04L 43/08; H04L 41/5009; H04L 65/4084; H04L 47/2441; H04L 41/5025; H04L 45/38; H04L 47/263; H04L 12/1435;
(Continued)

(56) References Cited

U.S. PATENT DOCUMENTS 8,520,523 B2   8/2013  De Roucy et al.
8,787,174 B2 * 7/2014  Riley ..................... H04L 12/14
                                                       370/237
(Continued)

FOREIGN PATENT DOCUMENTS

EP   2 472 946        7/2012
EP   3001602 A1 *    3/2016 ........... H04L 12/189

OTHER PUBLICATIONS

Ma et al. U.S. Appl. No. 61/754,939, filed Jan. 21, 2013.*
European Search Report dated Sep. 10, 2015 issued in counterpart application No. 15150076.6-1853, 9 pages.

*Primary Examiner* — Wutchung Chu
(74) *Attorney, Agent, or Firm* — The Farrell Law Firm, P.C.

(57) ABSTRACT

Disclosed is a method of managing congestion by a Policy Control and Charging Rules Function (PCRF). The method includes receiving at least one piece of video flow related information; receiving, from an evolved Node B (eNB), congestion state information for the eNB and at least one User Equipment (UE); determining a data transmission rate of at least one video flow on the basis of the received congestion state information and the received video flow related information; and adjusting the data transmission rate of the at least one video flow on the basis of the determined data transmission rate.

20 Claims, 11 Drawing Sheets

(51) Int. Cl.
*H04N 21/238* (2011.01)
*H04N 21/647* (2011.01)
*H04L 12/24* (2006.01)
*H04L 29/06* (2006.01)
*H04L 12/26* (2006.01)

(52) U.S. Cl.
CPC ........... *H04L 65/80* (2013.01); *H04N 21/238* (2013.01); *H04N 21/64738* (2013.01); *H04W 28/0289* (2013.01); *H04L 41/509* (2013.01); *H04L 41/5067* (2013.01); *H04L 43/028* (2013.01)

(58) Field of Classification Search
CPC ............. H04W 28/0289; H04W 28/12; H04W 28/0231; H04W 28/02; H04W 24/08; H04W 48/06; H04W 28/0268
See application file for complete search history.

(56) References Cited

U.S. PATENT DOCUMENTS

| | | | | |
|---|---|---|---|---|
| 8,792,439 | B2* | 7/2014 | Kahn | H04W 28/22 370/232 |
| 2012/0023246 | A1* | 1/2012 | Castro Castro | H04L 41/0893 709/229 |
| 2012/0052866 | A1* | 3/2012 | Froehlich | H04L 47/14 455/445 |
| 2012/0084371 | A1* | 4/2012 | Rajagopalan | H04L 41/5054 709/206 |
| 2012/0100879 | A1* | 4/2012 | Tine | H04W 28/26 455/512 |
| 2012/0140620 | A1* | 6/2012 | Hogan | H04L 41/0893 370/230 |
| 2012/0158949 | A1 | 6/2012 | Lee | |
| 2012/0198020 | A1* | 8/2012 | Parker | H04W 12/08 709/217 |
| 2012/0218892 | A1* | 8/2012 | Kotecha | H04L 47/14 370/235 |
| 2012/0236713 | A1 | 9/2012 | Kakadia et al. | |
| 2012/0257499 | A1* | 10/2012 | Chatterjee | H04W 28/0284 370/232 |
| 2012/0317269 | A1 | 12/2012 | Weppler et al. | |
| 2012/0324100 | A1* | 12/2012 | Tomici | H04L 45/123 709/224 |
| 2013/0091248 | A1 | 4/2013 | Viswanathan et al. | |
| 2013/0163424 | A1* | 6/2013 | Goerke | H04W 24/02 370/235 |
| 2013/0212630 | A1* | 8/2013 | Venkatraman | H04N 21/23439 725/62 |
| 2013/0250761 | A1* | 9/2013 | Shatzkamer | H04L 47/14 370/235 |
| 2013/0263167 | A1* | 10/2013 | Parthasarathy | H04L 41/5067 725/14 |
| 2014/0233390 | A1* | 8/2014 | Schmid | H04L 47/125 370/236 |
| 2014/0273922 | A1* | 9/2014 | McMurry | H04M 15/58 455/405 |
| 2014/0321271 | A1* | 10/2014 | Bonnier | H04W 28/0215 370/230 |
| 2014/0321277 | A1* | 10/2014 | Lynn, Jr. | H04L 43/0811 370/235 |
| 2015/0009826 | A1* | 1/2015 | Ma | H04W 28/0268 370/235 |
| 2015/0296559 | A1* | 10/2015 | Liu | H04W 36/26 370/329 |
| 2016/0119395 | A1* | 4/2016 | Li | H04L 12/189 709/219 |
| 2016/0212668 | A1* | 7/2016 | Castro Castro | H04L 47/20 |
| 2016/0295298 | A1* | 10/2016 | Lee | H04N 21/23439 |
| 2016/0308924 | A1* | 10/2016 | Wei | H04L 65/80 |

* cited by examiner

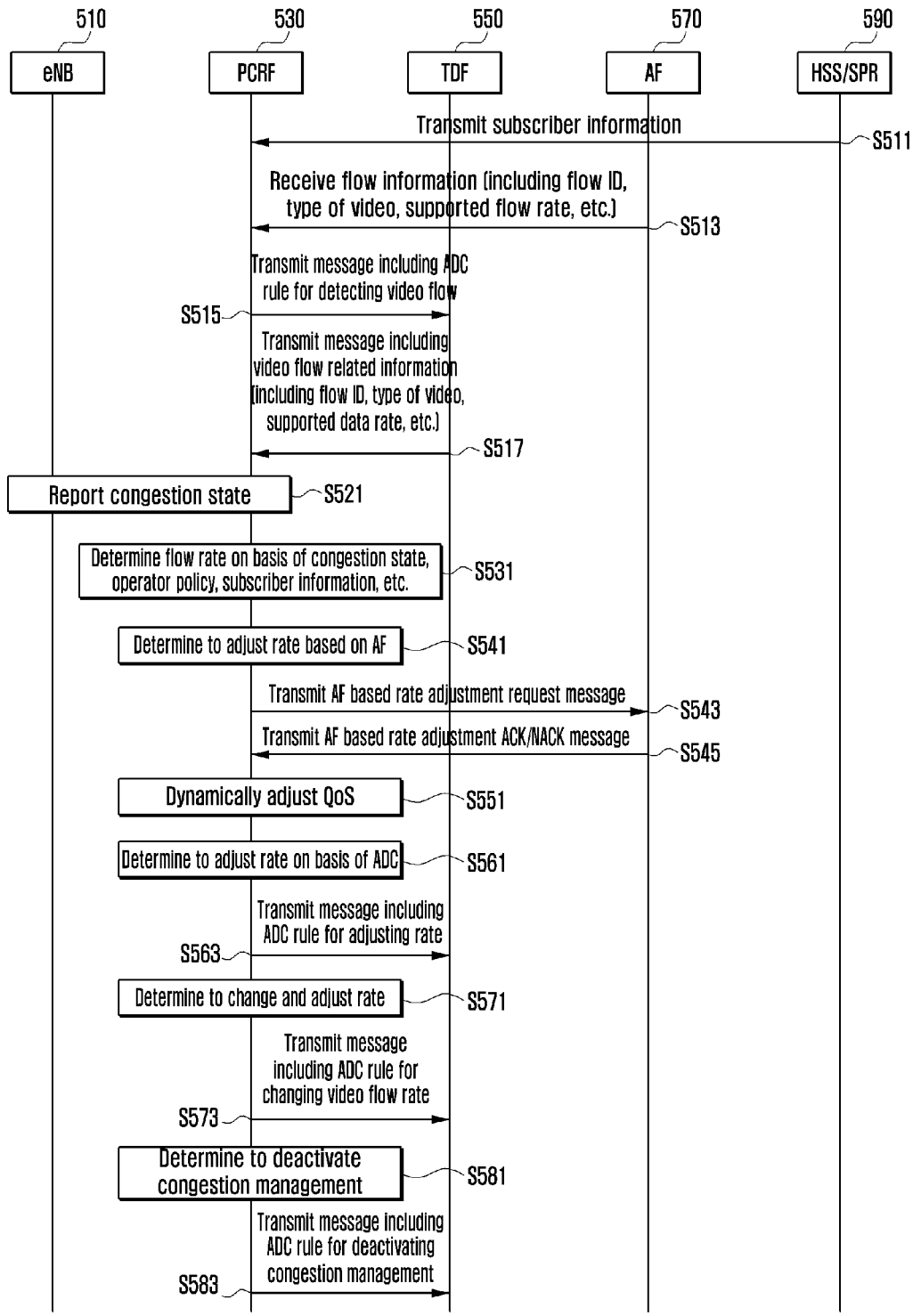

METHOD AND APPARATUS FOR MANAGING CONGESTION IN WIRELESS COMMUNICATION SYSTEM

PRIORITY

This application claims priority under 35 U.S.C. §119(a) to Korean Patent Application No. 10-2014-0000811, filed on Jan. 3, 2014, the entire disclosure of which is hereby incorporated herein by reference.

BACKGROUND

1. Field of the Disclosure

The present disclosure relates to a method and an apparatus for managing congestion in a wireless communication system.

2. Description of the Related Art

Wireless communication systems have been developed to provide a voice service and a data service, and may be divided into a radio access network, a core network, and other elements. A user equipment (UE) and an element of a radio access network, i.e., an evolved Node B (eNB), are wirelessly connected to each other. The radio access network, a core network, and nodes of the core network are wiredly connected to each other.

In general, since a wireless resource is more restrictive than a wired resource, a probability that wireless resources between the UE and the radio access network are lacking is relatively high. Such a situation in which wireless resources between the UE and the radio access network are lacking is typically due to congestion of the radio access network. In a wireless network system, video traffic is the main cause of congestion.

In a wireless network, the rate of use of a mobile video application may increase rapidly. A video application used through a wired network, e.g., a video conference, video on demand, live video streaming, on-line gaming, and a video application have gradually been used more frequently in a wireless network.

According to mobile data prediction reports, it is predicted that video traffic occupies two-thirds of the world's mobile data traffic. Due to this, video applications may be the main reason behind network congestion in mobile networks. Thus, a method of managing a network by managing video traffic is required to alleviate the main reason behind congestion in a mobile network.

SUMMARY

The present embodiments have been made to address at least the above problems and disadvantages and to provide at least the advantages described below. Accordingly, an aspect of the present disclosure is to provide an improved method and apparatus for managing congestion in a wireless communication system. Another aspect of the present disclosure is to provide a method and apparatus for providing cooperation between a plurality of video flows by considering a congestion state of a network, a user profile, and a policy of an operator.

In accordance with an aspect of the present disclosure, a method of managing congestion by a Policy Control and Charging Rules Function (PCRF) is provided. The method includes receiving at least one piece of video flow related information; receiving, from an evolved Node B (eNB), congestion state information for the eNB and at least one User Equipment (UE); determining a data transmission rate of at least one video flow on the basis of the received congestion state information and the received video flow related information; and adjusting the data transmission rate of the at least one video flow on the basis of the determined data transmission rate.

In accordance with an aspect of the present disclosure, a method of adjusting a video flow transmission rate by an AF is provided. The method includes configuring service information including a video flow supported by an AF and a data transmission rate supportable with respect to the video flow; transmitting the configured service information to a PCRF; receiving, from the PCRF, a data transmission rate adjustment request message for at least one video flow supported by the AF; and adjusting a data transmission rate for the at least one video flow on the basis of the data transmission rate adjustment request message.

In accordance with an aspect of the present disclosure, a method of adjusting a video flow transmission rate by a TDF is provided. The method includes receiving, from a PCRF, ADC rule related information for detecting a video flow; detecting a flow ID for at least one video traffic and data rate information supported by the at least one video traffic on the basis of the received ADC rule related information; transmitting, to the PCRF, video flow information including the detected flow ID and the detected data rate information; receiving, from the PCRF, new ADC rule related information based on the video flow information; and adjusting a data transmission rate for at least one video traffic on the basis of the new ADC rule related information.

In accordance with an aspect of the present disclosure, a method of reporting a congestion state by an eNB is provided. The method includes receiving, from a PCRF, a congestion state report request message; monitoring a congestion state for the eNB and at least one UE on the basis of the congestion state report request message; and transmitting a congestion state response message including a result obtained by monitoring the congestion state for the eNB and the at least one UE.

In accordance with an aspect of the present disclosure, an apparatus of a PCRF for managing congestion is provided. The apparatus includes a transmission/reception unit that performs data communication with at least one network node; and a congestion management controller that makes a control to receive at least one piece of video flow related information, to receive, from an eNB, congestion state information for the eNB and at least one UE, to determine a data transmission rate for at least one video flow on the basis of the received congestion state information and the received video flow related information, and to adjust the data transmission rate of the at least one video flow on the basis of the determined data transmission rate.

In accordance with an aspect of the present disclosure, an apparatus of an AF for adjusting a video flow transmission rate is provided. The apparatus includes a transmission/reception unit that performs data communication with at least one network node; and a rate adjustment controller that makes a control to configure service information including a video flow supported by an AF and a data transmission rate supportable with respect to the video flow, to transmit, to a PCRF, the configured service information, to receive, from the PCRF, a data transmission rate adjustment request message for at least one video flow supported by the AF, and to adjust a data transmission rate for the at least one video flow on the basis of the data transmission rate adjustment request message.

In accordance with an aspect of the present disclosure, an apparatus of a TDF for adjusting a video flow transmission rate is provided. The apparatus includes a transmission/reception unit that performs data communication with at least one network node; and a rate adjustment controller that makes a control to receive, from a PCRF, ADC rule related information for detecting a video flow, to detect a flow ID for at least one video traffic and data rate information supported by the at least one video traffic on the basis of the received ADC rule related information, to transmit, to the PCRF, video flow information including the detected flow ID and the detected data rate information, to receive, from the PCRF, new ADC rule related information based on the video flow information, and to adjust a data transmission rate for at least one video traffic on the basis of the new ADC rule related information.

In accordance with an aspect of the present disclosure, an apparatus of an eNB for reporting a congestion state is provided. The apparatus includes a transmission/reception unit that performs data communication with at least one network node; and a congestion detection controller that makes a control to receive, from a PCRF, a congestion state report request message, to monitor a congestion state for the eNB and at least one UE on the basis of the congestion state report request message, and to transmit a congestion state response message including a result obtained by monitoring the congestion state for the eNB and the at least one UE.

BRIEF DESCRIPTION OF THE DRAWINGS

The above and other aspects, features and advantages of the present disclosure will be more apparent from the following detailed description in conjunction with the accompanying drawings, in which:

FIG. 5 is a signal flow diagram illustrating a procedure of managing congestion according to an embodiment of the present disclosure;

DETAILED DESCRIPTION OF EMBODIMENTS OF THE PRESENT DISCLOSURE

Figure 1:
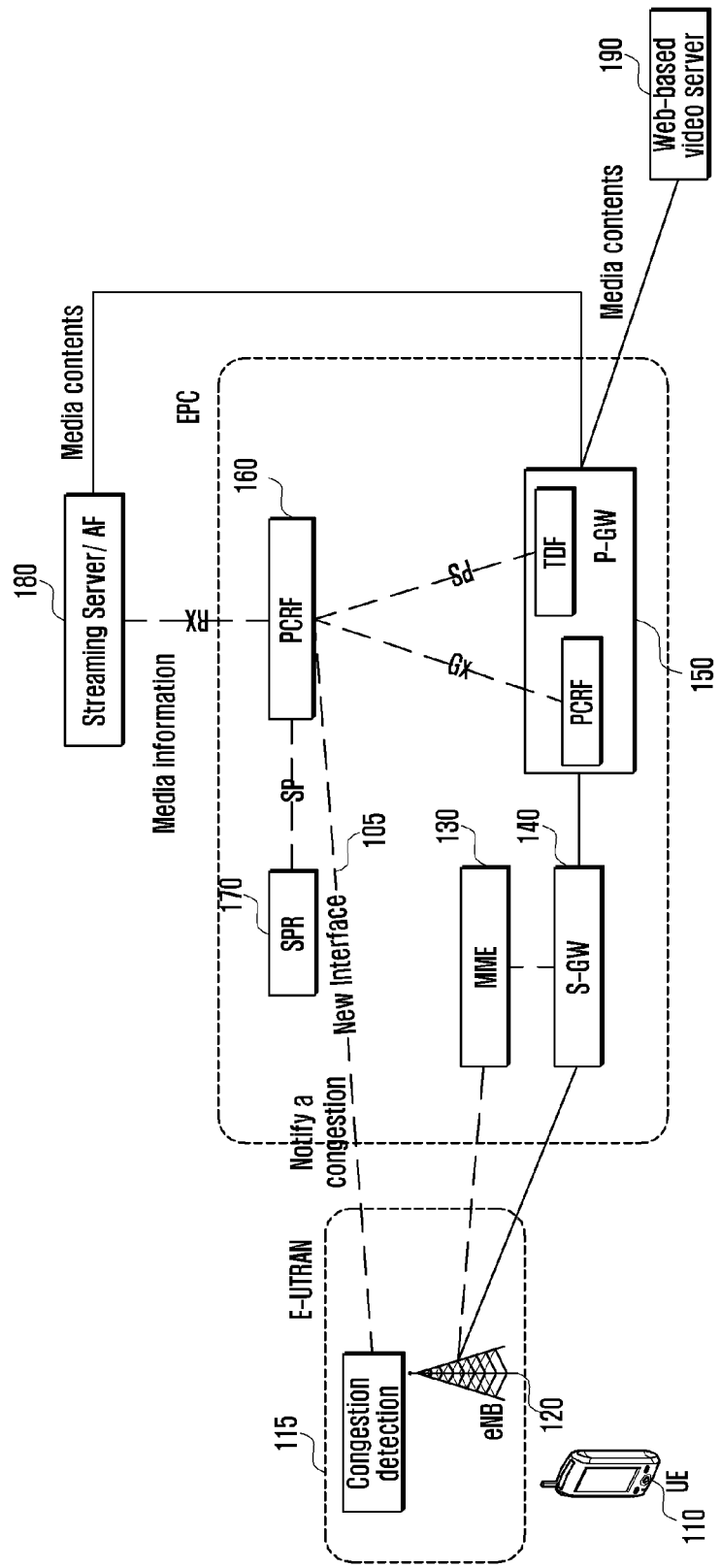
FIG. 1 illustrates an improved Policy and Charging Control (PCC) architecture for processing Quality of Experience (QoE) congestion management according to an embodiment of the present disclosure.

Hereinafter, various embodiments will be described with reference to the accompanying drawings.

Hereinafter, the term "video flow" may be understood as having the same meaning as the term "video stream". Further, the term "flow" may have the same meaning as the term "stream". Further, "video flow related information" may include video flow ID information, data rate information supported by the video flow, subscriber information of a UE, and video flow provider policy information.

User plane congestion management may be generated by a Radio Access Network (RAN) interface for cell congestion or Evolved Packet Core (EPC) congestion. In the RAN, since data demand is dynamic, congestion may be frequently generated. Thus, a method of effectively managing congestion is required. The congestion may be avoided by further supplying a wireless resource. However, when the wireless resource is further supplied, in the position of an operator, CAPital EXpenditures (CAPEX) and OPerating EXpenditures (OPEX) may increase. Thus, an operator would want to increase use of resources through an effective congestion management mechanism.

Hereinafter, a method of effectively managing congestion will be described. Further, a method of managing congestion by dynamically adjusting quality of video traffic at an application level will be described. User plane congestion management can manage congestion by granting priority to a part of specific user traffic or blocking specific traffic. Application congestion management may be also considered.

In the prior art, Guaranteed Bit Rate (GBR) traffic from the viewpoint of a mobile video application is disclosed. This solution may be applied in order to guarantee transfer video traffic to a specific application such as a service supported by an operator. However, most of video applications are third party applications, and use both the HyperText Transfer Protocol (HTTP)-based transfer mechanism and the Real-time Transfer Protocol (RTP)/Real-Time Streaming Protocol (RTSP)-based transfer mechanism. In this case, a mechanism which is different from the related art may be required.

In RTP/RTSP-based video streaming, a video may be coded in scalable video coding, and may be transmitted while specific information for identifying contents of a packet is placed on a header. A base layer of the video may be required for a basic quality of a video to be reproduced, and an enhancement layer of the video may be used for improving the quality of the video. Thus, when a packet of the enhancement layer is lost due to congestion, the quality of the video may be influenced, but the video may be reproduced without interruption. However, when the base layer is lost, the video may not be reproduced continuously. A server transmits a limited enhancement layer and the base layer by using a feedback mechanism at an application level, thereby adjusting the quality of the video. An RTP mechanism enables the network to know the contents of a video packet. RTP header information enables the network to know whether contents of a packet are base layer data or enhancement layer data. This can help to determine a part of network levels on the basis of a network state.

An HTTP-based video streaming transmission mechanism corresponds to a method of dividing a video into small chunks which may include video data having a specific length. Each of the chunks is divided into smaller chunks having different qualities and then stored in a server. High quality implies a larger file size. Each of the chunks may be downloaded by a request from a user which requests a chunk having a specific quality. Further, according to a network congestion state, a client can request specific video quality chunks through an HTTP message. Thus, video quality may be dynamically adapted on the basis of the current congestion of the network. Such dynamic adjustment of the video quality is based on an application.

Further, each video flow attempts to occupy as much bandwidth as possible in order to provide more excellent quality to a specific video. The network has a plurality of video flows, and when the network is in a congested state, each video flow attempts to occupy the possible largest bandwidth. This attempt may influence other video flows to cause the congestion. Further, since the quality of the video changes frequently, the frequent change may influence the QoE of a video application for a user.

As described above, the mechanism for dynamically adjusting video quality at an application level controls the quality of a video after the network is congested. Thus, the network cannot help being congested frequently. Quality switching at a client, which may influence the QoE of a video, may occur frequently. Further, when there is a plurality of video flows competing with each other, it is difficult to guarantee fairness of the video flows.

Although the congestion in the network can be alleviated by simply adjusting a video rate, in this case, the QoE of the video flow can be influenced seriously. For example, when a data rate of the RTP/RTSP video flow is limited, packets belonging to all layers of video may be congested. Dropping of a base layer packet can greatly influence the QoE as compared with dropping of an enhancement layer. Thus, in detail, the network can select a layer of the video flow which may be dropped. This selection by the network can alleviate the congestion and improve the QoE of the video.

In the case of a Dynamic Adaptive Streaming over HTTP (DASH)-based video streaming, when an actually supported video flow rate is not identified and the video flow rate is limited, a ping-pong effect may be generated during a switching process between two video qualities. This may influence the QoE of the video flow.

Important factors to be considered for managing congestion include a subscription policy of a user and a policy of an operator. All users are not equal to each other from the viewpoint of the operator. When the network is congested, a flow of each user can be processed differently. Further, when alleviating the congestion, the operator should store a scheme of differently processing users.

From the viewpoint of the operator, the QoE of a user should be improved with respect of a plurality of users. Thus, it is necessary to adjust a video transmission rate through cooperation amongst a plurality of video flows. The video transmission rate adjustment may be provided by the network. That is, this problem cannot be solved at an application level.

Next, a rate allocation problem in traffic management will be described. When the rate allocation problem is mathematically modeled as an optimization problem, this problem may correspond to a Mixed Integer Linear Programming (MILP) program. A method of allocating an optimum traffic by considering an available bandwidth and fairness amongst a plurality of flows in the managed traffic can be achieved by solving this MILP problem. However, when traffic is allocated according to the MILP, it is difficult to make optimum decisions on-line due to a high calculation overhead.

≫ Video flow set for rate adaptation: F={$f_1, f_2, f_3, \ldots f_N$}, Here, N denotes the number of video flows.

≫ Set of supported video rate: R={$r_1, r_2, r_3, \ldots r_M$}, Here, M is the number of supported rates.

≫ Total available bandwidths: B

≫ Priority of each flow: $P_i$ ($0<P_i<1$), which can be determined on the basis of a policy of an operator.

≫ Availiable video rate: $W_i$ ($1 \le i \le M$), zero-one vector of M×1.

[$W_i$]$_j$=1, this is a case where $r_j$ in R is supported by flow $f_i$.

≫ Maximum video rate for each flow: Xi ($1 \le i \le M$) is a zero-one vector of M×1.

[$X_i$]$_j$=1, this is a case where $r_j$ in R is maximally supported by flow $f_i$.

≫ Flow allocation: A is an N×M matrix.

$A_{ij}$=1, this is a case where a rate $r_j$ is allocated to flow i.

≫ An object is to generally maximize the amount of processing achieved by all flows allocated to a specific video data rate according to the following constraints.

One video rate is exactly allocated to each video data.

This allocated video rate is in supported video rates.

Total amount of processing is lower than an available bandwidth.

Proportion fairness (the allocated video rate is at least $P_i$ times a maximally supported video rate of this flow).

$$\text{Maximize} \sum_{i=1}^{N} \sum_{j=1}^{M} A_{ij} \times R_j \text{ (aggregate data rate of all the flows)}$$

Such that $$\forall i, \sum_{j=1}^{M} A_{ij} \le 1$$

(Each flow is assigned one rate)

$$\forall i, \forall j, A_{ij} \le [W_i]_j$$

(Assigned flow rate is supported by the flow)

$$\sum_{i=1}^{N} \sum_{j=1}^{M} A_{ij} \times R_j \le B$$

(aggregate data rate is available)

$$\forall i, \sum_{j=1}^{M} A_{i,j} \times R_j \ge$$

[$X_i$]$_j \times P_i$ (Allocated rate for each flow is proportionally fair)

$$\forall i, \sum_{j=1}^{M} A_{i,j} \times R_j \le$$

[$X_i$]$_j$ (Allocated rate is limited to the maximum supported data rate)

Next, an algorithm for allocating a rate according to an embodiment of the present disclosure will be described. When the optimization problem is solved, a solution for optimization will be provided. However, the optimization problem is not suitable for calculating the allocation of a rate on-line due to the high complexity of the calculations. In order to solve the above-mentioned problem, an algorithm, which will be described below, can be considered as a method for allocating a video rate.

≫ Available information (Input)

Video flow set: F={$f_1, f_2, f_3, \ldots f_N$}, Here, N denotes the total number of video flows.

Video rate set supported by flow $f_i$: $R_i$={$r_1, r_2, r_3, \ldots r_{Mi}$}, Here, $M_i$ denotes the number of video rates supported by flow $f_i$ in an ascending order.

Total available bandwidth: B
Priority based on subscribing and operator policy: P={$p_1$, $p_2$, $p_3$, ... $p_N$}.
≫ Object (Output)
a data rate $r_i$ in the video rate set $R_i$ is allocated to each flow $f_i$ in the video flow set F to fairly allocate the bandwidth B to the video flow set F according to the priority P of the flow.
≫ Procedure
Data rate diffusion for each flow: $S_i$=(Max ($R_i$)–Min ($R_i$))/$M_i$
Average diffusion: $S_{Avg}$=($S_1$+$S_2$+ . . . +$S_N$)/N
Average available data rate step: $U_{avi}$=B/$S_{Avg}$
Data rate step allocated for each flow: $U_i$=Ceil (($U_{avi}$*$P_i$)/($P_i$+$P_2$+ . . . +$P_N$))
Rate allocation based on $U_i$
  Until allocated data rate does not exceed B, selecting from rates having high priority to rates having low priority.
  For each flow, if available, allocating rate $U_{ith}$ from $R_{fi}$, and if unavailable, allocating highest data rate.
  When other bandwidths are not sufficient for data rate $U_{ith}$ for flow allocating as low a data rate as possible.

Next, a mechanism for managing congestion on the basis of the Policy and Charging Control (PCC) according to an embodiment of the present disclosure will be described. An object of the algorithm of the present disclosure is to allocate an optimum data rate for each video flow by considering fairness and a subscriber policy. In an embodiment of the present disclosure, a PCC architecture may be improved to process congestion management in order to effectively manage congestion of the network.

In the $3^{rd}$ Generation Partnership Project (3GPP), the PCC architecture is used to provide a Quality of Service (QoS) and to set flow based charging. In an embodiment of the present disclosure, the PCC architecture may be improved to adjust the video flow rate through processing at a packet level and application detection in order to process congestion.

In the PCC architecture, a Traffic Detection Function (TDF) may be used for detecting an application in the network by detecting 5-tuples (a source IP address, a destination IP address, a source port, a destination port, and a protocol type) or monitoring Deep Packet Inspection (DPI). Thus, the TDF function can be used for discriminating and acquiring more pieces of information in the video flow through the 5-tuples and the DPI. Further, the TDF may be used for discriminating a specific application, blocking a specific flow, and limiting a rate.

In an embodiment of the present disclosure, information relating to contents may be achieved through the Application Function (AF) or the TDF. The TDF may be used for discriminating a specific video flow, and detecting more pieces of information on transmission types of the video rates used and supported through the DPI. The video related information is necessary for determining adjusting of rates of video flows. In an embodiment of the present disclosure, the PCRF can be improved to control rate adjustment on the basis of an operator policy and a user subscribing policy as well as a congestion state. The PCRF can adjust and determine a rate allocated to each flow in consideration of fairness and on the basis of a congestion state in a user subscribing policy and a video flow. Further, an operator policy can provide different priorities to different service providers.

FIG. 1 illustrates an improved PCC architecture for processing Quality of Experience (QoE) congestion management according to an embodiment of the present disclosure.

Referring to FIG. 1, a UE 110 uses a voice service or a data service provided by a wireless communication system. A data provided through the wireless communication system is divided into GBR data and non-GBR data, but in an embodiment, for convenience, GBR data may have the same meaning as non-GBR data. According to an embodiment, a system for providing the GBR data is provided.

In an embodiment of the present disclosure, the UE 110 may include one or more of, for example, a portable telephone, a notebook, a tablet PC, a camera, an electronic picture frame, a vending machine, a Closed-Circuit TeleVision (CCTV), an electronic measurement sensor, a water measurement sensor, a seismic sensor, and a fire alarm sensor of a building, but is not limited thereto.

A radio access network 115 may include one or more evolved Node Bs (eNBs) 120. The eNB 120 is a base station for controlling a cell. Here, the cell refers to a cell of a general cellular system. Further, the eNB 120 is a base station for managing and controlling the cell, but in the present disclosure, the cell and the base station may have the same meaning for the sake of convenience.

The eNB 120 is connected to the UE 110 through a wireless channel, and can control wireless resources. For example, the eNB 120 may generate control information required in a cell as system information and broadcast the generated control information, or may allocate a wireless resource in order to transmit/receive data or control information to/from the UE 110. In an embodiment of the present disclosure, it is assumed that the eNB 120 can detect congestion of the RAN and report the congestion to the PCRF with respect to a specific user facing a congestion situation.

The core network may include a Mobility Management Entity (MME) 130, a Serving GateWay (S-GW) 140, a packet data network (PDN) Gateway (P-GW) 150, a PCRF 160, a subscriber profile repository (SPR) 170, a streaming server (AF) 180, and a web based video server 190.

The MME 130 manages the UE 110 in an idle mode, and selects a connectable S-GW 140 and a connectable P-GW 150. In addition, the MME 130 can perform a function relating to roaming and authentication. Further, the MME 130 can process a bearer service generated by the UE 110, which may include a service which provides an ability for transferring data between the UE 130 and a PDN in real-time.

The S-GW 140 functions as a mobility anchor when the eNBs 120 of the UE 110 are handed over therebetween or are moved between 3GPP wireless networks.

The P-GW 150 allocates an Internet Protocol (IP) address of the UE 110, perform a packet data related function of the core network, and functions as a mobility anchor when moving between the 3GPP wireless network and a non-3GPP wireless network. Further, the P-GW 150 can determine a bearer band to be provided to a subscriber and perform a forwarding function and a routing function for packet data. The P-GW 150 can include the PCRF and the TDF.

The PCRF 160 controls a function relating to a policy for the bearer and charging. In particular, in an embodiment of the present disclosure, the PCRF 160 collects a list of adaptable rates of flows through the DPI by the TDF. Further, the PCRF 160 can determine a current rate by applying fairness for each flow on the basis of a current network congestion state. A packet level operation can be applied to the PCRF 160 on the basis of the determined flow rate according to a transmission mechanism.

In RTP/RTSP based video streaming, a packet of the enhancement level can be dropped at a specific rate. In HTTP based video streaming, a TCP flow rate may be limited to a specific data rate supported by the video flow. In accordance with an embodiment of the present disclosure, the ping-pong effect for video quality conversion can be controlled. A processing mechanism at a packet level according to an embodiment of the present disclosure may be implemented in the TDF or the PCRF 160.

Figure 2:
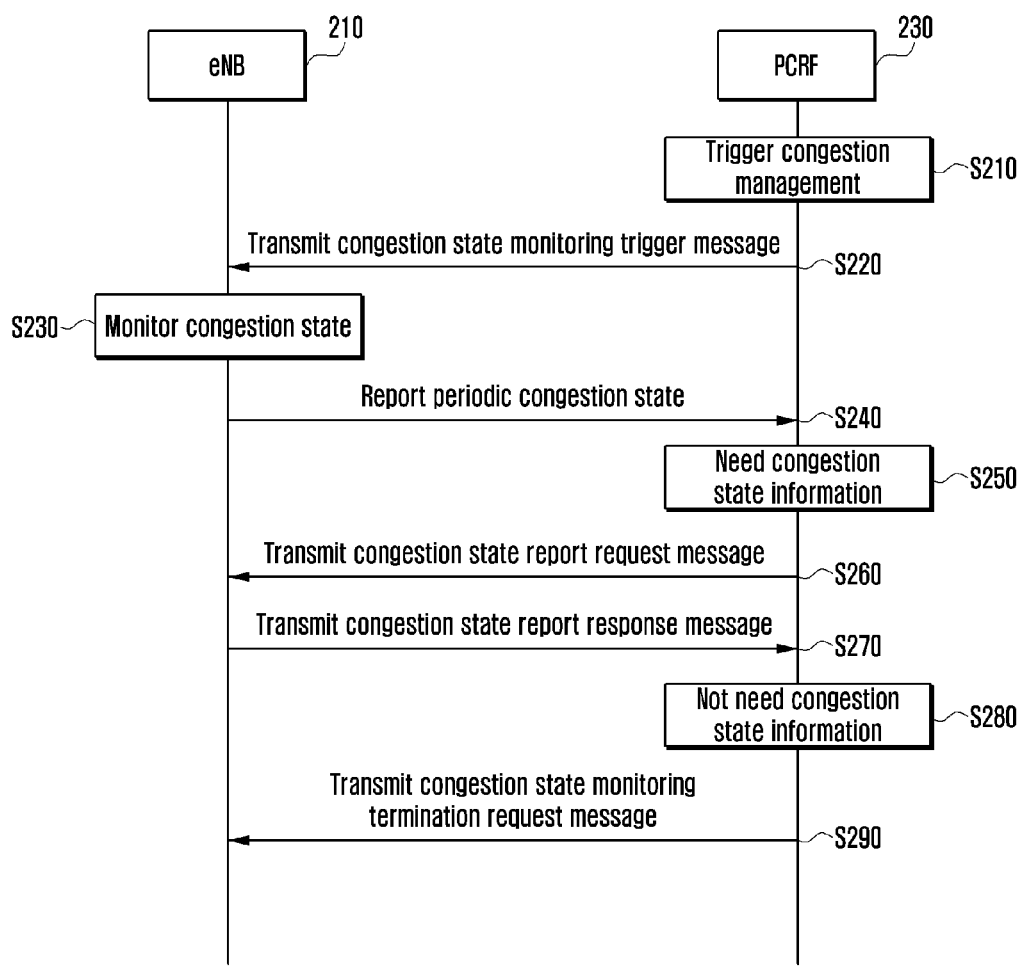
FIG. 2 is a signal flow diagram illustrating a method of identifying congestion according to an embodiment of the present disclosure.

FIG. 2 is a signal flow diagram illustrating a method of identifying congestion according to an embodiment of the present disclosure. Referring to FIG. 2, a user situation congestion identification may be performed by the eNB 120. The eNB 120 can detect a congestion level on the basis of current use of a network. A new interface (reference numeral 105 in FIG. 1) may be configured between an eNB 210 and a PCRF 230 of FIG. 2 to transfer a congestion state to the PCRF 230. The new interface may be a logical interface.

According to an embodiment of the present disclosure, it is assumed that the PCRF 230 can process congestion management by adjusting a video rate. Accordingly, the PCRF 230 triggers processing of congestion management in step S210. The PCRF 230 transmits, to the eNB 210, a message for configuring a congestion state monitoring trigger message in step S220. The message for configuring a congestion state monitoring trigger may include a parameter indicating whether a periodic report is necessary with respect to a congestion state, and a parameter for describing a period interval when the periodic report is needed. After receiving the message for configuring a congestion state monitoring trigger from the PCRF 230 in step S230, the eNB 210 starts congestion state monitoring. Further, the eNB 210 periodically reports, to the PCRF 230, a result of the congestion state monitoring on the basis of the parameters received from the PCRF 230 in step S240.

The PCRF 230 can make a configuration to periodically report the congestion state as described above as well as request a report for current congestion at a predetermined time from the eNB if necessary. When the PCRF 230 wants a congestion state report at a predetermined time in step S250, the PCRF 230 transmits a congestion state request message to the eNB 210 in step S260. When the eNB 210 receives the congestion state request message, the eNB 210 measures a current congestion state and reports the measured result to the PCRF 230 in step S270.

The PCRF 230 terminates congestion management when a congestion management operation is not required in step S280. Further, when it is determined that the PCRF 230 terminates the congestion management, the PCRF 230 transmits, to the eNB 210, a congestion state monitoring and report termination request message. The eNB 210, which receives the congestion state monitoring and report termination request message, terminates a congestion state monitoring operation and a congestion state reporting operation.

Figure 3:
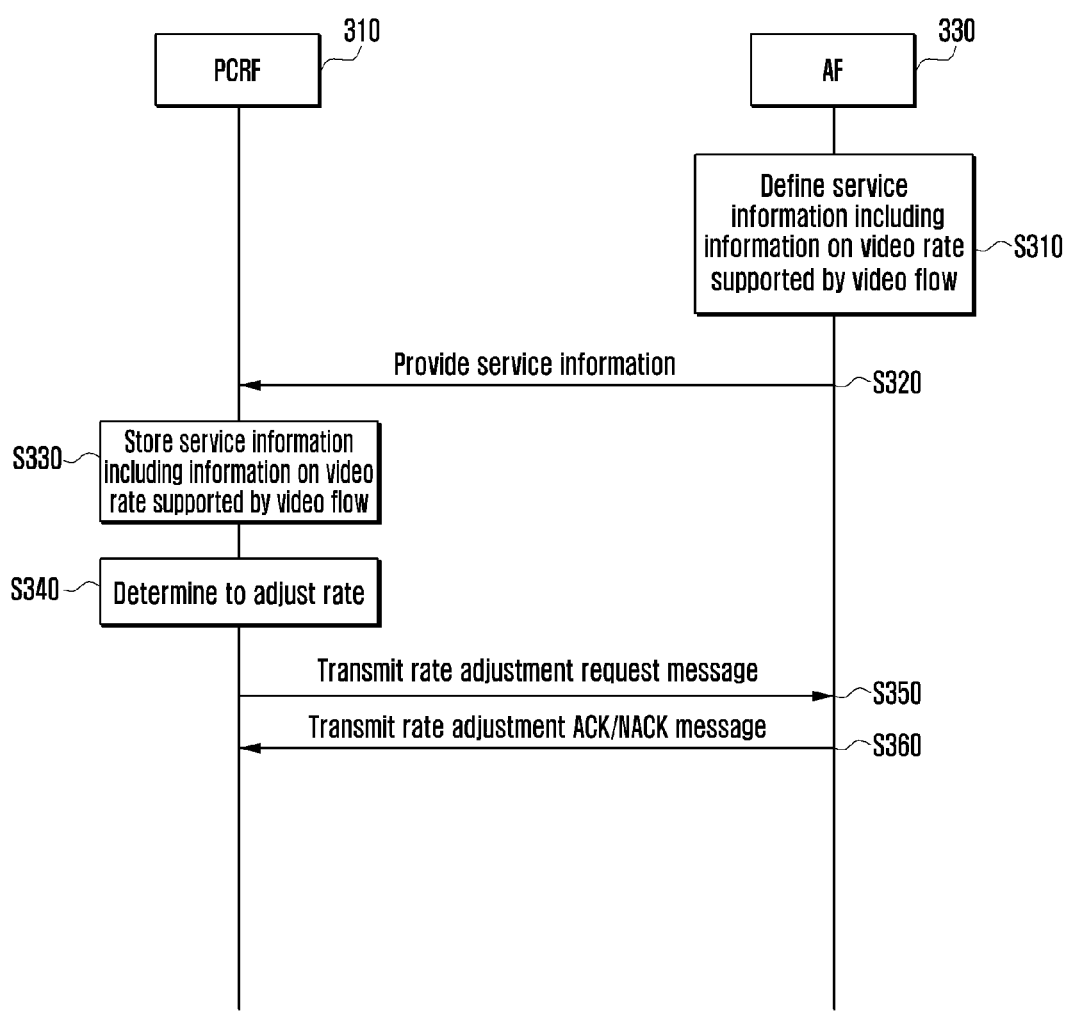
FIG. 3 is a signal flow diagram illustrating a method of managing congestion between a Policy Control and Charging Rules Function (PCRF) and a streaming server according to an embodiment of the present disclosure.

FIG. 3 is a signal flow diagram illustrating a method of managing congestion between a PCRF and a streaming server (AF) according to an embodiment of the present disclosure. When a video application provider agrees to process a QoE using AF 330, a method of detecting traffic flow information using an Rx interface (an interface between the PCRF and a streaming server (AF)) and changing a data rate of a video according to a congestion state will be described below.

Referring to FIG. 3, the Rx interface may be configured between a PCRF 310 and the AF 330. An application provider, which agrees with a service provider, can use the Rx interface in order to provide a specific server through the service provider. When the application provider agrees with an operator to support congestion management, the AF 330 may be improved. The AF 330 may define service information. The service information includes information on a video rate supported by a specific video flow in step S310.

The AF 330 provides, to the PCRF 310, additional information (service information) on a video application in order to determine a data rate to be used according to the congestion state in step S320. The service information includes information on a video rate supported by a specific video flow. Further, the service information may further include information on a flow ID and the type of video. The PCRF 310, which receives the service information, stores the received information. The PCRF 310 may also store information on a video rate supported by a specific video flow, which is stored in the received information in step S330.

The PCRF 310 may determine a congestion state. The determination on a congestion state may be based on a congestion state report received from an eNB. The PCRF 310 determines rate adjustment on the basis of the determination on a congestion state in step S340. The PCRF 310 transmits, to the AF 330, a rate adjustment request message on the basis of the determination on rate adjustment.

The AF 330 can accept or refuse the rate adjustment on the basis of the rate adjustment request message by transmitting a rate adjustment ACK/NACK message in step S360. When accepting the rate adjustment, the AF 330 changes a video data rate and transmits an acceptance response message to the PCRF 310. When the AF 330 does not accept the rate adjustment, the AF can refuse the rate adjustment, and transmit a refusal response message to the PCRF 310. Further, a network can perform another method of limiting a data rate.

Figure 4:
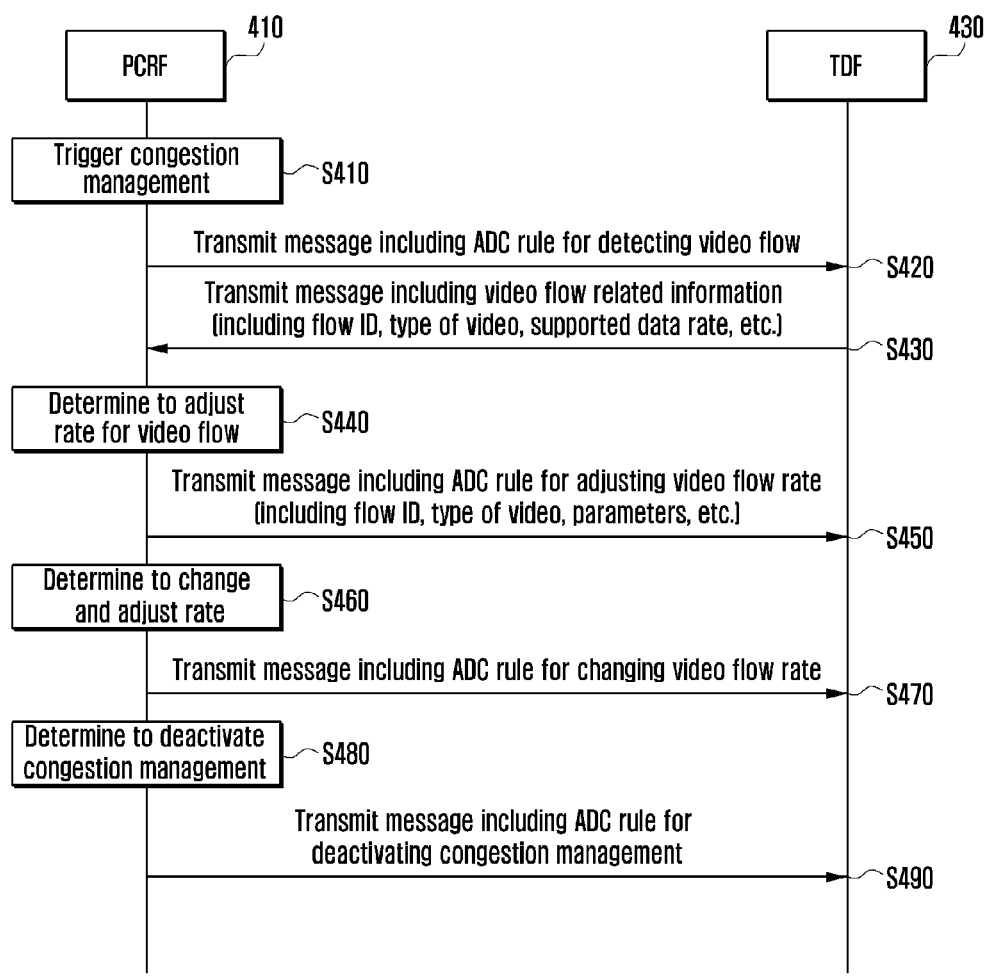
FIG. 4 is a signal flow diagram illustrating a method of detecting traffic flow on the basis of a Traffic Detection Function (TDF) and adjusting a rate.

FIG. 4 is a signal flow diagram illustrating a method of detecting traffic flow on the basis of a TDF and adjusting a rate. The TDF detects video flow through the DPI. Further, the TDF can additionally detect video information such as media information, CODEC information, a supported data rate, etc. A PCRF 410 provides a proper Application Detection and Control (ADC) rule in order to detect a specific flow type. Further, the PCRF 410 can provide a new ADC rule in order to differently limit data rates of different video flows according to types of video traffic.

In an embodiment of the present disclosure, an Sd interface between the PCRF 410 and the TDF 430 can be improved in order to process TDF based flow detection and rate adjustment as described below. Hereinafter, the method will be described in more detail with reference to FIG. 4.

The PCRF 410 can determine to process congestion management through video rate adjustment in step S410. The PCRF 410 provides, to the TDF 430, information on the ADC rule in order to detect a video flow in step S420. When receiving the information on the ADC rule from the PCRF 410, the TDF 430 can detect a video flow. The TDF 430 can detect video flow related information such as a flow ID, the type of video, and a supported data rate by monitoring a video flow, and when the video flow related information is detected, the TDF 430 reports the detected information to the PCRF 410 in step S430. The video flow related information may be used for estimating a rate of the video flow according to a congestion state.

The PCRF 410 determines rate adjustment for each video flow on the basis of the received video flow related information in step S440. When the rate adjustment for each flow is determined, the PCRF 410 transmits, to the TDF 430, a message for commanding to trigger a specific ADC rule in order to perform the rate adjustment in step S450. The specific ADC rule may include parameters relating to a flow ID, the type of video and rate adjustment. In RTP/RTSP, the parameter may include information indicating a specific video layer to be interrupted to adjust a data rate. In DASH based video streaming, the parameter may include information which designates video rate limitation for each chunk of a specific video flow.

The PCRF 410 determines whether to adjust a video rate when a congestion state is changed in step S460. When it is determined to adjust the video rate due to the change in the congestion state, the PCRF 410 transmits, to the TDF 430, a message for making a request to change the ADC rule in step S470. Further, the PCRF 410 determines whether to deactivate the ADC rule in step S480. The deactivating of the ADC rule may be used when the PCRF 410 determines to deactivate a congestion management mechanism or when it is unnecessary to limit a video rate for a part of specific video flows. When it is determined to deactivate the congestion management mechanism, the PCRF 410 transmits, to the TDF 430, a message for making a request to deactivate the ADC rule in step S490.

FIG. 5 is a signal flow diagram illustrating a procedure of managing congestion according to an embodiment of the present disclosure. A procedure for transmitting/receiving a message between different network nodes in order to manage congestion will be described. However, the procedure in FIG. 5 is merely one embodiment, and a sequence of messages transmitted by different networks is not necessarily limited thereto.

Referring to FIG. 5, a PCRF 530 receives subscriber information from a home subscriber server (HSS)/a subscriber profile repository (SPR) 590 in step S511. The PCRF 530 receives flow related information from an AF 570 in step S513. The flow related information may be received through an Rx interface between the AF 570 and the PCRF 530. The flow related information may include information on a flow ID, the type of a video flow, and a supported flow rate. The PCRF 530 provides, to the TDF 550, information on the ADC rule in order to detect video flow in step S515. The providing of the information on the ADC rule may correspond to a trigger message for making a request to identify a flow for specific user traffic. When receiving the information on the ADC rule from the PCRF 530, the TDF 550 detects video flow. The TDF 550 detects video flow related information such as a flow ID, the type of video, and a supported data rate by monitoring the video flow, and when the video flow related information is detected, reports the detected information to the PCRF 530 in step S517. The video flow related information may be used for estimating a rate of the video flow according to a congestion state.

An eNB 510 detects a congestion state of a network, and reports, to the PCRF 530, a result obtained by detecting the congestion state in step S521. The congestion state reporting may be performed periodically. Further, when there is a request from the PCRF 530 or the eNB 510 detects predetermined congestion, the congestion state reporting may be performed aperiodically.

The PCRF 530 determines a currently supported video data rate for each video flow on the basis of the following information in step S531:

1. Current congestion state of a user (different users may have different congestion states on the basis of the RAN connected thereto).

2. Policy of an operator (an operator can determine to differently process videos received from different service providers).

3. User subscription information (a user can have different subscriptions, and when congestion occurs, congestion processing of each user can be differently processed on the basis of subscription information.)

4. Video transmission type (RTP/RTSP based or HTTP based)

5. Supported data rate (the number of supported video rates is based on a specific video)

When an actual data rate for each specific flow is determined by the PCRF 530, the PCRF 530 can make a request to adjust a video flow data rate by the TDF 550 or the AF 570 according to the video flow and a supported mechanism. The PCRF 530 determines rate adjustment on the basis of the determination on a congestion state in step S541. The PCRF 530 transmits, to the AF 570, a rate adjustment request message on the basis of the determination on rate adjustment in step S543. The AF 570 can accept or refuse the rate adjustment on the basis of the rate adjustment request message by transmitting a rate adjustment ACK/NACK message in step S545. When accepting the rate adjustment, the AF 570 changes a video data rate and transmits an acceptance response message to the PCRF 530. When the AF 570 does not accept the rate adjustment, the AF refuses the rate adjustment, and transmits a refusal response message to the PCRF 530.

In step S551, the PCRF 530 can adjust the video flow data rate by dynamically adjusting a QoS.

The PCRF 530 determines rate adjustment for each video flow on the basis of the received video flow related information in step S560. When the rate adjustment for each flow is determined, the PCRF 530 transmits, to the TDF 550, a message for making a command to trigger a specific ADC rule in order to perform the rate adjustment in step S563. The specific ADC rule may include parameters relating to a flow ID, the type of video and rate adjustment. The TDF 550 adjusts the video flow rate on the basis of the received ADC rule related information.

The PCRF 530 determines whether to adjust a video rate when a congestion state is changed in step S571. When it is determined to adjust the video rate due to the change in the congestion state, the PCRF 530 transmits, to the TDF 550, a message for making a request to change the ADC rule in step S573. Further, the PCRF 530 determines whether to deactivate the ADC rule in step S581. The deactivating of the ADC rule may be used when the PCRF 530 determines to deactivate a congestion management mechanism or when it is unnecessary to limit a video rate for a part of specific video flows. When it is determined to deactivate the congestion management mechanism, the PCRF 530 transmits, to the TDF 550, a message for making a request to deactivate the ADC rule in step S583.

Figure 6A:
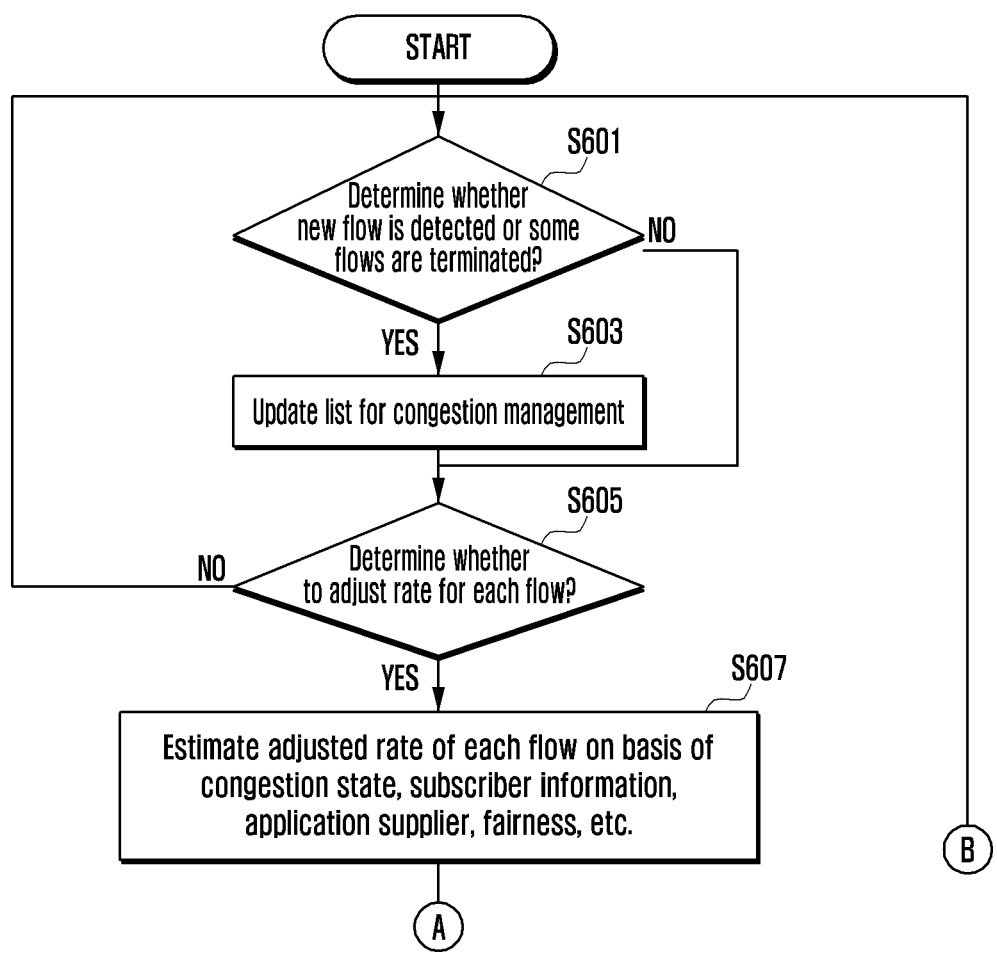
FIGS. 6A and 6B are flowcharts illustrating a procedure of managing congestion in a PCRF according to an embodiment of the present disclosure.
Figure 6B:
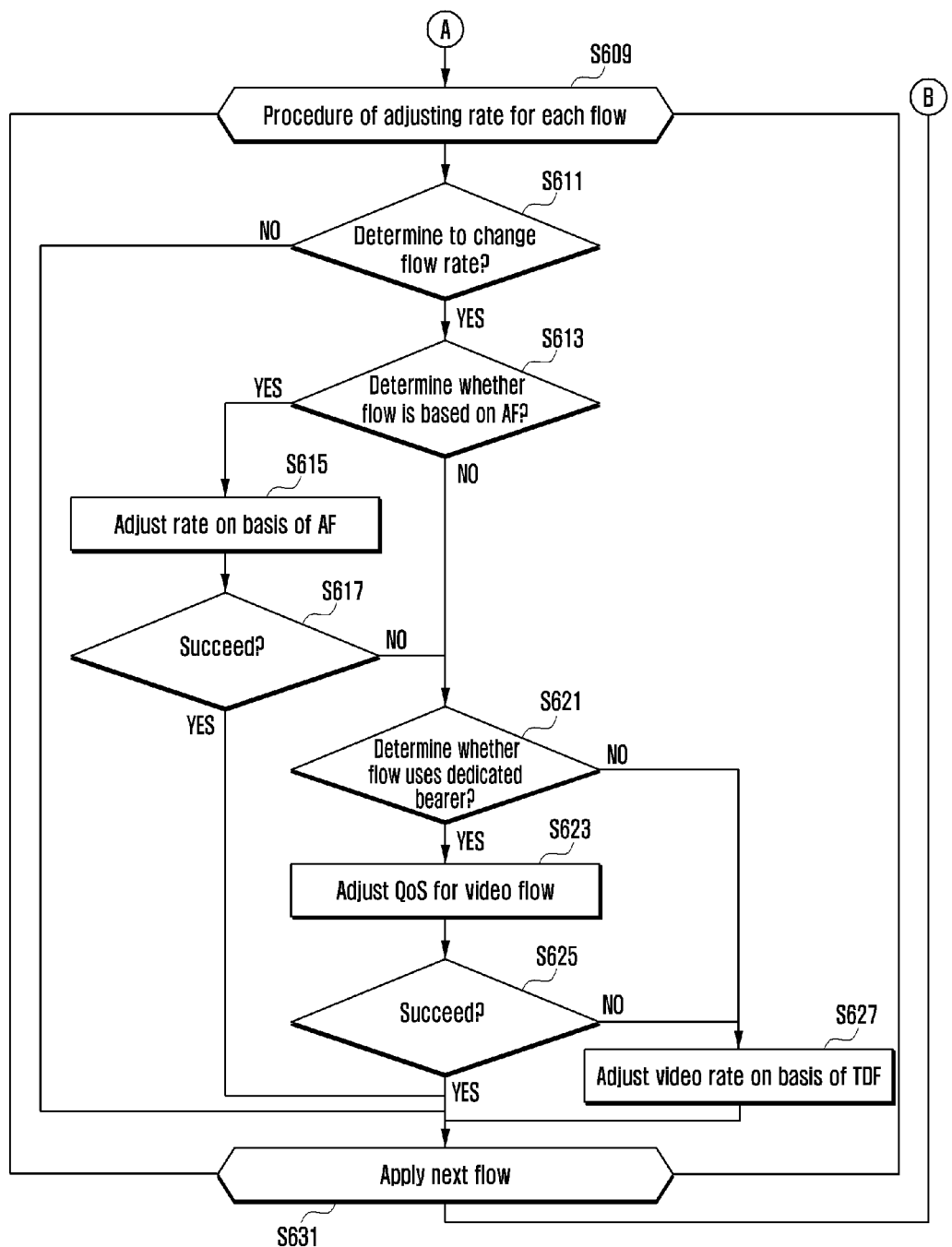

FIGS. 6A and 6B are flowcharts illustrating a procedure of managing congestion in a PCRF according to an embodiment of the present disclosure. In FIG. 6A, a PCRF continuously monitors a congestion state of a network in step S601 by determining whether a new flow is detected or other flows have been terminated, and constructs a list of pieces of video flow information to be operated due to the change in a congestion state in step S603. The list is a group of video flows obtained through a specific PDN-GW from flows in a specific RAN which can consider congestion management. Whenever a new flow is detected or a part of flows are terminated, the list of flows may be updated.

When a congestion state is partially changed and the PCRF is determined to adjust a data rate of video flows in step S605, the PCRF estimates rate adjustment for each video flow by considering a plurality of factors described above in step S607. Further, when a data rate for each video flow is determined, fairness may be considered. If it is determined not to adjust the rate, the procedure proceeds to step S631 of FIG. 6B, where a next flow is applied. Since the method of considering each of the factors has been described in FIGS. 1 to 5, the description thereof will be omitted.

In FIG. 6B, a procedure for adjusting the rate for each flow is executed in step S609. When a change in data rate for each flow is determined in step S611, the PCRF executes the data rate for each flow through processing at a packet level on the basis of the type of the used transmission mechanism. The PCRF then determines whether flow, whose data rate is to change, is based on the AF in step S613. When it is determined that the flow is based on the AF, congestion management through rate adjustment based on the AF is performed in step S615. Since the congestion management operation based on the AF has been described in FIG. 3, the detailed description thereof will be omitted.

When the flow, which is to change the data rate thereof, is not based on the AF, the PCRF proceeds to step S621. The PCRF determines whether a bearer of the flow whose data rate is to change uses a dedicated bearer in step S621. When it is determined that the dedicated bearer is used, the data rate is adjusted by adjusting QoS for a flow in step S623. When the dedicated bearer is not used, a congestion management operation is performed through adjustment of the data rate on the basis of the TDF in step S627. Since the congestion management operation based on the TDF has been described in FIG. 4, the detailed description thereof will be omitted.

Figure 7:
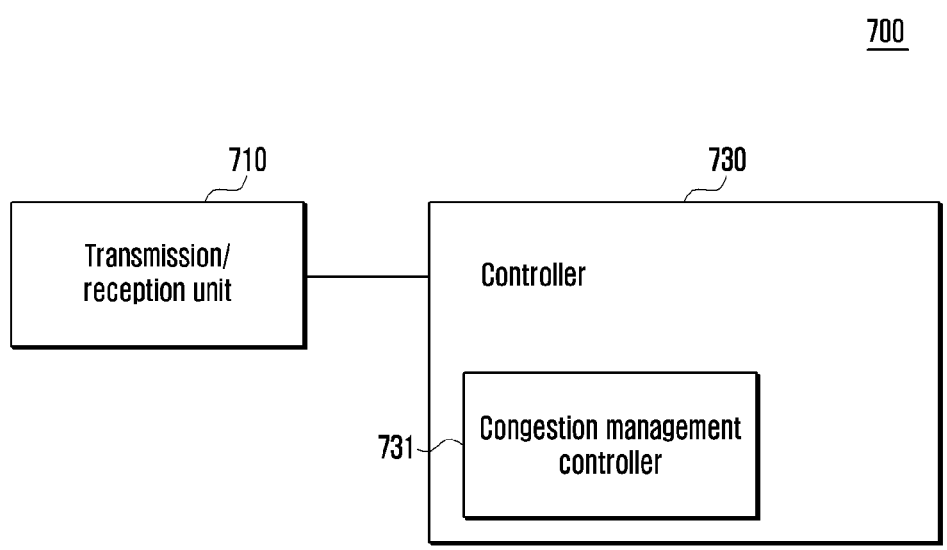
FIG. 7 illustrates a PCRF according to an embodiment of the present disclosure.

FIG. 7 illustrates a PCRF according to an embodiment of the present disclosure.

In accordance with an embodiment of the present disclosure, a PCRF 700 controls a function relating to a policy for a bearer and charging. In particular, in an embodiment of the present disclosure, the PCRF 700 collects a list of adaptable rates of flows through a DPI by a TDF. Further, the PCRF 700 determines a current rate by applying fairness for each flow on the basis of a current network congestion state. A packet level operation can be applied to the PCRF 700 on the basis of the determined flow rate according to a transmission mechanism.

Referring to FIG. 7, the PCRF 700 includes a transmission/reception unit 710 for performing data communication with at least one network node, and a controller 730 for controlling an overall operation of the PCRF 700. The controller 730 includes a congestion management controller 731.

The congestion management controller 731 controls to receive at least one piece of video flow related information, to receive congestion state information for an eNB and at least one UE from the eNB, to determine a data transmission rate for at least one video flow on the basis of the received congestion state information and the received video flow related information, and to adjust a data transmission rate for the at least one video flow on the basis of the determined data transmission rate. At this time, the video flow related information may include video flow ID information, data rate information supported by the video flow, subscriber information of a UE, and video flow provider policy information.

Further, the congestion management controller 731 controls to transmit to the TDF ADC rule related information which makes a request to detect video flow related information, to receive from the TDF the video flow ID information and video flow related information including data rate information supported by the video flow in response to the ADC rule related information, and to transmit to the TDF new ADC rule related information for adjusting a rate of at least one video flow on the basis of the video flow related information.

Further, the congestion management controller 731 controls to adjust a data transmission rate for the at least one video flow by transmitting to the AF a data transmission rate adjustment request message when a provider of a video flow, which is to adjust a transmission rate thereof, is an AF and allows QoE adjustment from the PCRF.

Further, the congestion management controller 731 controls to receive congestion state information for the eNB and at least one UE via a new interface formed between the PCRF and the eNB.

Further, the congestion management controller 731 controls to determine whether a bearer of the video flow uses a dedicated bearer when a video flow, whose data rate is to change, is not based on the AF, to adjust a data rate by adjusting a QoS for a video flow when it is determined that the dedicated bearer is used, and to transmit to the TDF new ADC rule related information for adjusting a rate of the video flow when the dedicated bearer is not used.

Although the PCRF 700 has been described above as being divided into the transmission/reception unit 710, the controller 730, and the congestion management controller 731 for the convenience of the description of the operation of the PCRF 700, the PCRF 700 is not necessarily limited thereto. As well, it is obvious that the controller 730 of the PCRF 700 can control the operations of the PCRF according to the respective embodiments of the present disclosure, which have been described through FIGS. 1 to 6.

Figure 8:
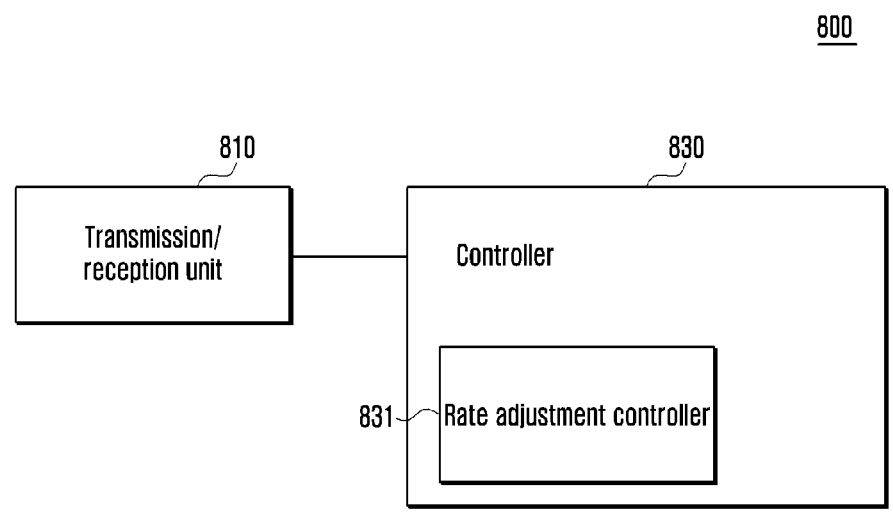
FIG. 8 illustrates a TDF according to an embodiment of the present disclosure.

FIG. 8 illustrates a TDF according to an embodiment of the present disclosure.

Referring to FIG. 8, a TDF 800 includes a transmission/reception unit 810 for performing data communication with at least one network node and a controller 830 for controlling overall operations of the TDF 800. Further, the controller 830 includes a rate adjustment controller 831.

The rate adjustment controller 831 controls to configure service information including a video flow supported by an AF and a data transmission rate supportable with respect to the video flow, to transmit to a PCRF the configured service information, to receive from the PCRF a data transmission rate adjustment request message for at least one video flow supported by the AF, and to adjust a data transmission rate for the at least one video flow on the basis of the data transmission rate adjustment request message.

At this time, the data transmission rate adjustment request message can be determined on the basis of congestion state information, video flow ID information, data rate information, subscriber information of a UE, and video flow provider policy information which are received by the PCRF.

Although the TDF 800 has been described above as being divided into the transmission/reception unit 810, the controller 830, and the rate adjustment controller 831 for the convenience of the description of the operation of the TDF 800, the TDF 800 is not necessarily limited thereto. As well, it is obvious that the controller 830 of the TDF 800 can control the operations of the TDF according to the respective embodiments of the present disclosure, which have been described through FIGS. 1 to 6.

Figure 9:
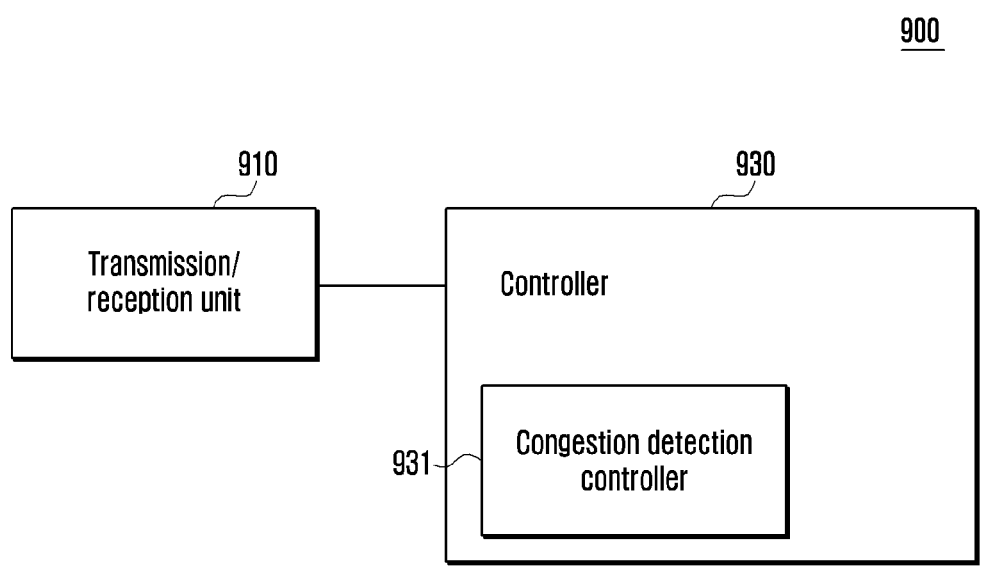
FIG. 9 illustrates an eNB according to an embodiment of the present disclosure.

FIG. 9 illustrates an eNB according to an embodiment of the present disclosure.

In an embodiment of the present disclosure, an eNB 900 is connected to a UE via a wireless channel and controls wireless resources. For example, the eNB 900 may generate control information required in a cell as system information and broadcast the generated control information, or may allocate a wireless resource in order to transmit/receive data or control information to/from the UE. In an embodiment of the present disclosure, it is assumed that the eNB can detect congestion in the RAN and report the congestion to the PCRF with respect to a specific user facing a congestion situation.

Referring to FIG. 9, the eNB 900 includes a transmission/reception unit 910 for performing data communication with at least one network node, and a controller 930 for controlling an overall operation of the eNB 900. The controller 930 includes a congestion detection controller 931.

In accordance with an embodiment of the present disclosure, the congestion detection controller 931 controls to receive from a PCRF a congestion state report request message, to monitor a congestion state for the eNB and at least one UE on the basis of the congestion state report request message, and to transmit a congestion state response message including the result obtained by monitoring the congestion state for the eNB and the at least one UE.

At this time, the congestion state response message can be transmitted via a new interface formed between the PCRF and the eNB. The congestion state response message can be used to determine a data transmission rate for at least one video flow using the eNB together with the video flow ID information, the data rate information, the subscriber information of a UE and the video flow provider policy information.

Although the eNB 900 has been described above as being divided into the transmission/reception unit 910, the controller 930, and the congestion detection controller 931 for the convenience of the description of the operation of the eNB 900, the eNB 900 is not necessarily limited thereto. As well, it is obvious that the controller 930 of the eNB 930 can control the operations of the eNB according to the respective embodiments of the present disclosure, which have been described through FIGS. 1 to 6.

Figure 10:
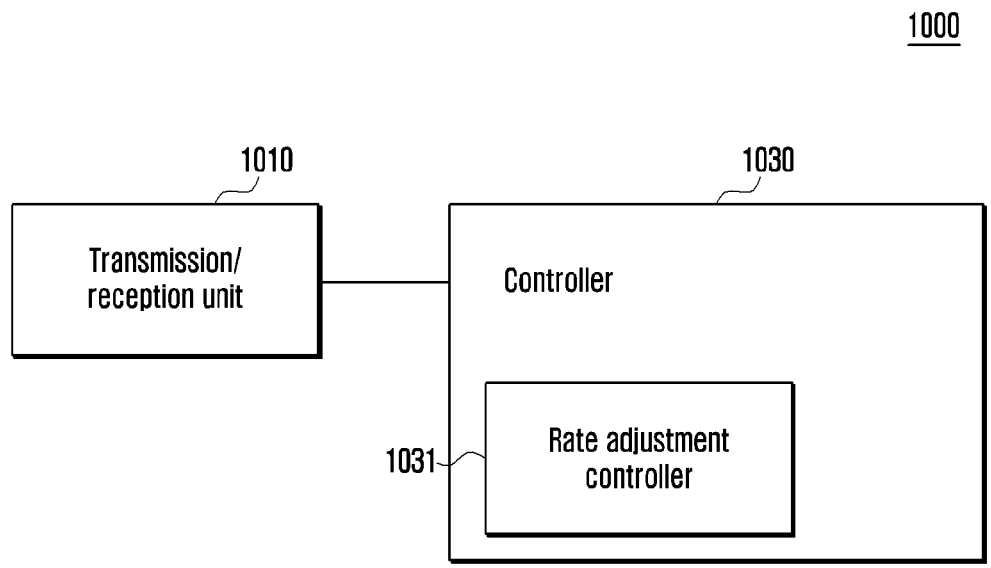
FIG. 10 illustrates an Application Function (AF) according to an embodiment of the present disclosure.

FIG. 10 illustrates an AF according to an embodiment of the present disclosure.

Referring to FIG. 10, the AF 1000 includes a transmission/reception unit 1010 for performing data communication with at least one network node, and a controller 1030 for controlling an overall operation of the AF 1000. Further, the controller 1030 includes a rate adjustment controller 1031.

In accordance with an embodiment of the present disclosure, the rate adjustment controller 1031 controls to receive from a PCRF ADC rule related information for detecting a video flow, to detect a flow ID for at least one video traffic and data rate information supported by the at least one video traffic on the basis of the received ADC rule related information, to transmit to the PCRF video flow information including the detected flow ID and the detected data rate information, to receive from the PCRF new ADC rule related information based on the video flow information, and to adjust a data transmission rate for at least one video traffic on the basis of the new ADC rule related information.

At this time, the new ADC rule related information may be determined on the basis of the video flow information, the congestion state information, the subscriber information of a UE, and the video flow provider policy information, which are received by the PCRF.

Although the AF 1000 has been described above as being divided into the transmission/reception unit 1010, the controller 1030, and the rate adjustment controller 1031 for the convenience of the description of the operation of the AF 1000, the AF 1000 is not necessarily limited thereto. As well, it is obvious that the controller 1030 of the AF 1000 can control the operations of the AF according to the embodiments of the present disclosure, which have been described through FIGS. 1 to 6.

While the present disclosure has been shown and described with reference to certain embodiments thereof, it will be understood by those skilled in the art that various changes in form and details may be made therein without departing from the spirit and scope of the disclosure as defined by the following claims and their equivalents.

What is claimed is:

1. A method of managing congestion by a Policy Control and Charging Rules Function (PCRF), the method comprising:
   receiving video flow related information including data rate information supported by a video flow and operator policy information;
   receiving, from a base station, congestion state information for the base station and at least one User Equipment (UE);
   determining a data transmission rate of the video flow based on the received congestion state information and the received video flow related information;
   determining whether the video flow is based on an Application Function (AF); and
   adjusting the data transmission rate of the video flow based on the AF, if the video flow is based on the AF, and based on whether a bearer of the video flow uses a dedicated bearer, if the video flow is not based on the AF.

2. The method of claim 1, wherein the video flow related information comprises video flow ID information and subscriber information of a UE.

3. The method of claim 1, wherein adjusting the data transmission rate of the video flow comprises, when a provider of a video flow whose transmission rate is to be adjusted is the AF and allows Quality of Experience (QoE) adjustment by a PCRF, transmitting, to the AF, a data transmission rate adjustment request message.

4. The method of claim 2, further comprising:
   transmitting, to a Traffic Detection Function (TDF), Application Detection and Control (ADC) rule related information which requests detection of the video flow related information;
   receiving, from the TDF, the video flow related information including the video flow ID information and data rate information supported by the video flow in response to the ADC rule related information; and
   transmitting, to the TDF, new ADC rule related information for adjusting a rate of the video flow based on the video flow related information.

5. The method of claim 1, wherein the congestion state information for the base station and the at least one UE is received via a new interface formed between the PCRF and the base station.

6. The method of claim 1, wherein adjusting the data transmission rate of the video flow comprises:
   when it is determined that the dedicated bearer is used, adjusting the data rate by adjusting a Quality of Service (QoS) for the video flow; and
   when it is determined that the dedicated bearer is not used, transmitting, to a TDF, new ADC rule related information for rate adjustment of the video flow.

7. A method of adjusting a video flow transmission rate by an Application Function (AF), the method comprising:
configuring service information including a video flow supported by an AF and data rate information supported by the video flow;
transmitting the configured service information to a Policy Control and Charging Rules Function (PCRF), the service information including the data rate information supported by the video flow and operator policy information;
if the video flow is based on the AF, adjusting a data transmission rate of the video flow based on the AF;
if the video flow is not based on the AF, receiving, from the PCRF, a data transmission rate adjustment request message for the video flow supported by the AF; and
adjusting the data transmission rate for the video flow based on the data transmission rate adjustment request message,
wherein the data transmission rate adjustment request message is determined based on congestion state information received from a base station and the service information by the PCRF, and
wherein the data transmission rate of the video flow is adjusted based on whether a bearer of the video flow uses a dedicated bearer, if the video flow is not based on the AF.

8. The method of claim 7, wherein the data transmission rate adjustment request message is determined based on video flow ID information, and subscriber information of a User Equipment (UE), which are received by the PCRF.

9. A method of adjusting a video flow transmission rate by a Traffic Detection Function (TDF), the method comprising:
receiving, from a Policy Control and Charging Rules (PCRF), Application Dectection Control (ADC) rule related information for detecting a video flow;
detecting a flow ID for video traffic and data rate information supported by the video traffic based on the received ADC rule related information;
transmitting, to the PCRF, video flow information including the detected flow ID and the detected data rate information;
if a bearer of the video flow does not use a dedicated bearer, receiving, from the PCRF, new ADC rule related information based on the video flow information, and adjusting a data transmission rate for the video traffic based on the new ADC rule related information; and
if the bearer of the video flow uses the dedicated bearer, adjusting the data transmission rate for the video traffic by adjusting a quality of service (QoS) for the video flow,
wherein the new ADC rule related information is determined based on congestion state information received from a base station and video related information including data rate information supported by the video flow and operator policy information by the PCRF.

10. The method of claim 9, wherein the new ADC rule related information is determined based on video flow ID information received by the PCRF and subscriber information of a User Equipment (UE).

11. A method of reporting a congestion state by a base station, the method comprising:
receiving, from a Policy Control and Charging Rules Function (PCRF), a congestion state report request message;
monitoring a congestion state for the base station and at least one User Equipment (UE) based on the congestion state report request message; and
transmitting a congestion state response message including a result obtained by monitoring the congestion state for the base station and the at least one UE,
wherein a data transmission rate of a video flow is determined based on the congestion state response message and video flow related information including data rate information supported by the video flow and operator policy information by the PCRF,
wherein the data transmission rate of the video flow is adjusted based on an Application Function (AF), if the video flow is based on the AF, and based on whether a bearer of the video flow uses a dedicated bearer, if the video flow is not based on the AF.

12. The method of claim 11, wherein the congestion state response message is used by the PCRF together with video flow ID information and subscriber information of a UE in order to determine the data transmission rate for the video flow using the base station.

13. A Policy Control and Charging Function (PCRF) for managing congestion, the PCRF comprising:
a transceiver configured to transmit and receive a signal; and
a controller configured to:
receive video flow related information including data rate information supported by video flow and operator policy information,
receive, from a base station, congestion state information for the base station and at least one User Equipment (UE),
determine a data transmission rate for the video flow based on the received congestion state information and the received video flow related information,
determine whether the video flow is based on an Application Function (AF), and
adjust the data transmission rate of the video flow based on the AF, if the video flow is based on the AF, and based on whether a bearer of the video flow uses a dedicated bearer, if the video flow is not based on the AF.

14. The PCRF of claim 13, wherein when a provider of a video flow whose transmission rate is to be adjusted is the AF and allows Quality of Experience (QoE) adjustment by the PCRF, the controller is further configured to adjust the data transmission rate for the video flow by transmitting, to the AF, a data transmission rate adjustment request message.

15. The PCRF of claim 13, wherein the controller is further configured to:
transmit, to a Traffic Detection Function (TDF), Application Detection and Control (ADC) rule related information for requesting detection of the video flow related information,
receive, from the TDF, the video flow related information including video flow ID information and the data rate information supported by the video flow in response to the ADC rule related information, and
transmit, to the TDF, new ADC rule related information for adjusting a rate of the video flow based on the video flow related information.

16. The PCRF of claim 14, wherein the controller is further configured to receive the congestion state information for the base station and the at least one UE via a new interface formed between the PCRF and the base station.

17. The PCRF of claim 13, wherein the controller is further configured to:

adjust, when it is determined that the dedicated bearer is used, the data rate by adjusting a Quality of Service (QoS) for the video flow, and when the dedicated bearer is not used, transmit, to a TDF, new ADC rule related information for adjusting the data rate of the video flow.

18. An Application Function (AF) for adjusting a video flow transmission rate, the AF comprising:

a transceiver configured to transmit and receive a signal; and a controller configured to:

configure service information including a video flow supported by the AF and data rate information supported by the video flow, transmit, to a Policy Control and Charging Rules Function (PCRF), the configured service information, the service inforamtion including data rate information supported by the video flow and operator policy information, if the video flow is based on the AF, receive, from the PCRF, a data transmission rate adjustment request message for the video flow supported by the AF, when the AF allows Quality of Experience (QoE) adjustment by a PCRF, and adjust a data transmission rate for the video flow based on the data transmission rate adjustment request message, wherein the data transmission rate adjustment request message is determined based on congestion state information received from a base station and the service information by the PCRF, and wherein the data transmission rate of the video flow is adjusted based on whether a bearer of the video flow uses a dedicated bearer, if the video flow is not based on the AF.

19. A Traffic Detection Function (TDF) for adjusting a video flow transmission rate, the TDF comprising:

a transceiver configured to transmit and receive a signal; and a controller configured to:

receive, from a Policy Control and Charging Rules (PCRF), Application Detection and Control (ADC) rule related information for detecting a video flow, detect a flow ID for a video traffic and data rate information supported by the video traffic based on the received ADC rule related information, transmit, to the PCRF, video flow information including the detected flow ID and the detected data rate information, if a bearer of the video flow does not use a dedicated bearer, receive, from the PCRF, new ADC rule related information based on the video flow information, and adjust a data transmission rate for the video traffic based on the new ADC rule related information; and if the bearer of the video flow uses the dedicated bearer, adjust the data transmission rate for the video traffic by adjusting a Quality of Service (QoS) for the video flow, wherein the new ADC rule related information is determined based on congestion state information received from a base station and video related information including data rate information supported by the video flow and operator policy information received from an application function by the PCRF.

20. A base station for reporting a congestion state, the base station comprising:

a transceiver configured to transmit and receive a signal; and a controller configured to:

receive, from a Policy Control and Charging Rules Function (PCRF), a congestion state report request message, monitor a congestion state for the base station and at least one User Equipment (UE) based on the congestion state report request message, and transmit a congestion state response message including a result obtained by monitoring the congestion state for the base station and the at least one UE, wherein a data transmission rate of a video flow is determined based on the congestion state response message and video flow related information including data rate information supported by the video flow and operator policy information by the PCRF, wherein the data transmission rate of the video flow is adjusted based on an Application Function (AF), if the video flow is based on the AF, and based on whether a bearer of the video flow uses a dedicated bearer, if the video flow is not based on the AF.

* * * * *